(12) United States Patent
You

(10) Patent No.: US 7,514,108 B2
(45) Date of Patent: Apr. 7, 2009

(54) POCKET BREAD AND ITS MANUFACTURING METHOD FOR MASS PRODUCTION

(76) Inventor: Seuk Won You, 125-1001 GwanakHyundai Apt., Bongchun-3dong, Gwanak-ku, Seoul 151-755 (KR)

( * ) Notice: Subject to any disclaimer, the term of this patent is extended or adjusted under 35 U.S.C. 154(b) by 645 days.

(21) Appl. No.: 10/474,002

(22) PCT Filed: Oct. 22, 2001

(86) PCT No.: PCT/KR01/01789

§ 371 (c)(1),
(2), (4) Date: Oct. 6, 2003

(87) PCT Pub. No.: WO02/34053

PCT Pub. Date: May 2, 2002

(65) Prior Publication Data

US 2004/0175458 A1   Sep. 9, 2004

(30) Foreign Application Priority Data

Oct. 27, 2000  (KR) .......................... 2000-0063589
Jan. 12, 2001  (KR) .......................... 2001-0001893
Apr. 4, 2001   (KR) .......................... 2001-0017932

(51) Int. Cl.
*A21D 8/00* (2006.01)
(52) U.S. Cl. .................. 426/18; 426/138; 426/549; 426/391; 426/496; 426/499; 426/512; 426/514
(58) Field of Classification Search .................. 426/94, 426/138, 275; 99/442, 441, 138
See application file for complete search history.

(56) References Cited

U.S. PATENT DOCUMENTS

| 1,979,429 | A | * | 11/1934 | Wilkes et al. | ............... 249/125 |
| 3,341,167 | A | * | 9/1967 | Weiss | ......................... 249/66.1 |
| 3,908,022 | A | * | 9/1975 | Selleck | ......................... 426/27 |
| 3,909,881 | A | * | 10/1975 | Anderson | ................... 425/116 |

(Continued)

FOREIGN PATENT DOCUMENTS

JP           62-89988 U      6/1987

(Continued)

*Primary Examiner*—Lien Tran
*Assistant Examiner*—Kelly Bekker
(74) *Attorney, Agent, or Firm*—Finnegan, Henderson, Farabow, Garrett & Dunner, LLP.

(57) ABSTRACT

The present invention relates to a pocket bread and its manufacturing method for mass production and more particularly, to a manufacturing method of the pocket bread for mass production comprising a kneading process of ingredients in an appropriate ratio, a first fermentation process of the kneaded dough, a molding process of the dough to form a pocket shape, a second fermentation process of the pocket-shape dough, and a baking process in an oven, wherein a sheet of dough is folded in half in the molding process to place the sheet of dough at the bottom and top of the molding frame in the molding process; the sheet of dough is continuously cut on either side of the molding frame with a cutting knife to provide a pocket-shape dough having the molding frame therebetween; and the obtained pocket-shape dough is fermented in a concave pen having a depth of 10-25 mm to form the desired pocket shape dough in the second fermentation process.

7 Claims, 5 Drawing Sheets

U.S. PATENT DOCUMENTS

| | | | | |
|---|---|---|---|---|
| 4,251,554 A | * | 2/1981 | Baisden | 426/128 |
| D261,820 S | * | 11/1981 | Yamanaka | D1/101 |
| 5,149,594 A | * | 9/1992 | Lewandowski et al. | 426/503 |
| 5,622,742 A | * | 4/1997 | Carollo | 426/279 |
| 5,641,527 A | * | 6/1997 | Burger | 426/94 |
| 5,780,082 A | * | 7/1998 | Rebeaud | 426/94 |
| 6,203,828 B1 | * | 3/2001 | Thota et al. | 426/76 |

FOREIGN PATENT DOCUMENTS

| | | |
|---|---|---|
| JP | 2000-000078 A | 1/2000 |
| KR | 1987-0002006 Y | 6/1987 |
| KR | 20-0198511 Y | 7/2000 |

* cited by examiner

POCKET BREAD AND ITS MANUFACTURING METHOD FOR MASS PRODUCTION

FIELD OF THE INVENTION

The present invention relates to a pocket bread and its manufacturing method for mass production and more particularly, to a method for manufacturing a pocket bread in a mass production scale by folding a sheet of dough in half, placing molding frame therebetween, cutting the both sides of molding frame with a cutting knife, and repeating this manufacturing process.

Generally, conventional hamburger bread has some drawbacks in that (i) fillings filled between the bread slices may be easily fall out, thus inviting visually filthy; and (ii) bread fillings may be squeezed out while being eaten due to the open sides of the hamburger. Korean Patent Application No. 2001-1893, which was filed by us, discloses a pocket bread and its manufacturing method, which provides a convenience of eating and manufacturing, diversity of products with easy filling, and improvement on value of products with unique pocket shape.

A method for manufacturing the pocket bread of Korean Patent Application No. 2001-1893 comprises the steps of placing a sheet of dough at the bottom and top of a molding frame having a pocket shape and cutting the sheet with a cutting knife having the same shape and a little wider size to the molding frame to secure a pocket shape space inside. However, if a cross section of the dough having a certain shape and size is wide and complicate, there are some disadvantages in high probability to have inferior result during the cutting process due to its own viscosity and elasticity of the dough, rising manufacturing cost due to complicate facilities and difficulty in continuous process.

Further, when the dough produced by the above manufacturing method is fermented during the second fermentation process on a flat pen, the pocket bread having standardized pocket shape is not expected due to the volume expansion with the fermentation.

SUMMARY OF THE INVENTION

Accordingly, an object of the present invention is to provide a pocket bread having standardized shape. Another object of the present invention is to provide a method for manufacturing the pocket bread for mass production by optimizing an error associated with the molding process which is the most important process in the manufacturing process.

The present invention provides a process for manufacturing a pocket bread of, comprising a kneading process of ingredients in an appropriate ratio, a first fermentation process of the kneaded dough, a molding process of the dough to form a pocket shape, a second fermentation process of the pocket-shape dough, and a baking process in an oven, wherein the sheet of dough is folded in half in the molding process to place the sheet of dough at the bottom and top of the molding frame, the sheet of dough is continuously cut at either side of the molding frame with a cutting knife to obtain a pocket-shape dough having the molding frame therebetween, the obtained pocket-shape dough is fermented in a concave pen having a depth of 10-25 mm to form a desired complete pocket shape of bread in the second fermentation process.

Instead of folding a sheet of dough, two slices of sheets having a wider width than the molding frame may be placed one at the bottom and the other at the top of the molding frame to be touched at the backside where the touched portion is sealed each other during the fermentation process via organic bonding. Then, the sheet of dough is cut with a cutting knife. The both sides cut is sealed weakly with the pressure applied to cut along with a cross section and completely with the followed fermentation process. The other touched portion where the pressure is not applied is pressed slightly with a roller, if necessary.

The pocket-shape dough having incomplete sealing is sealed completely with further fermentation process in a concave pen due to an organic bonding and volume expansion.

Detailed description will be only provided with the folded dough to avoid overlapped explanation hereinafter.

In the molding process of the pocket-shape dough, a plurality of molding frame is placed on the sheet of dough with an equal interval in the direction of length. The sheet of dough is folded in half to cover the molding frame and a continuous cutting of the folded dough is performed in a certain period in the same direction with the cutting knife.

Since a failure in the molding process and/or an interruption of a continuous process may occur with an accumulation of minute errors associated with a repeat operation for a long period of time or a failure of an arrangement of molding frames in an equal interval, it is preferred to operate a cutting knife connected with a sensor for a stabilized and reliant operation.

The molding frame to give pocket shape has round-shape of edge linking the bottom and side surface and a wall of one side perpendicularly to provide a standardized mouth.

The cutting knife to cut the both sides of sheets of dough has preferably straight line or "Y"-type splitting at the end.

The pocket bread produced from the above-described process in the present invention has an outer surface having opened portion in the front and sealed portion at the surroundings and end. The outer surface of the pocket bread may be of oval cross-section which has longer width than height for convenience in eating and the junction of both sides and bottom is round shape. Further, the outer surface of the pocket has a uniform thickness of 8 to 15 mm.

BRIEF DESCRIPTION OF THE DRAWINGS

The present invention will now be illustrated by way of example with reference to the accompanying drawing in which.

| 10: sheet of dough | 20: molding frame |
| 30: cutting knife | 40: concave pen |
| 50: outer surface | 60: mouth to fill fillers |
| 70: round shape | |

DETAILED DESCRIPTION OF THE PRESENT INVENTION

Figure 1A:
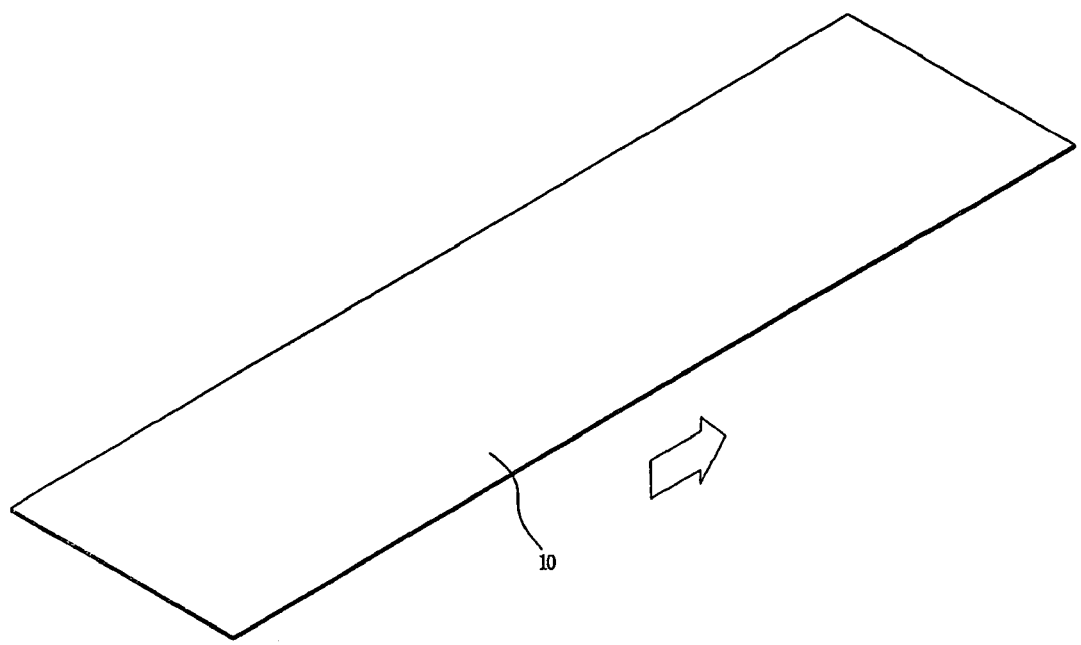
FIGS. 1a to 1d are schematical views of manufacturing process of the pocket bread according to the present invention.
Figure 1B:
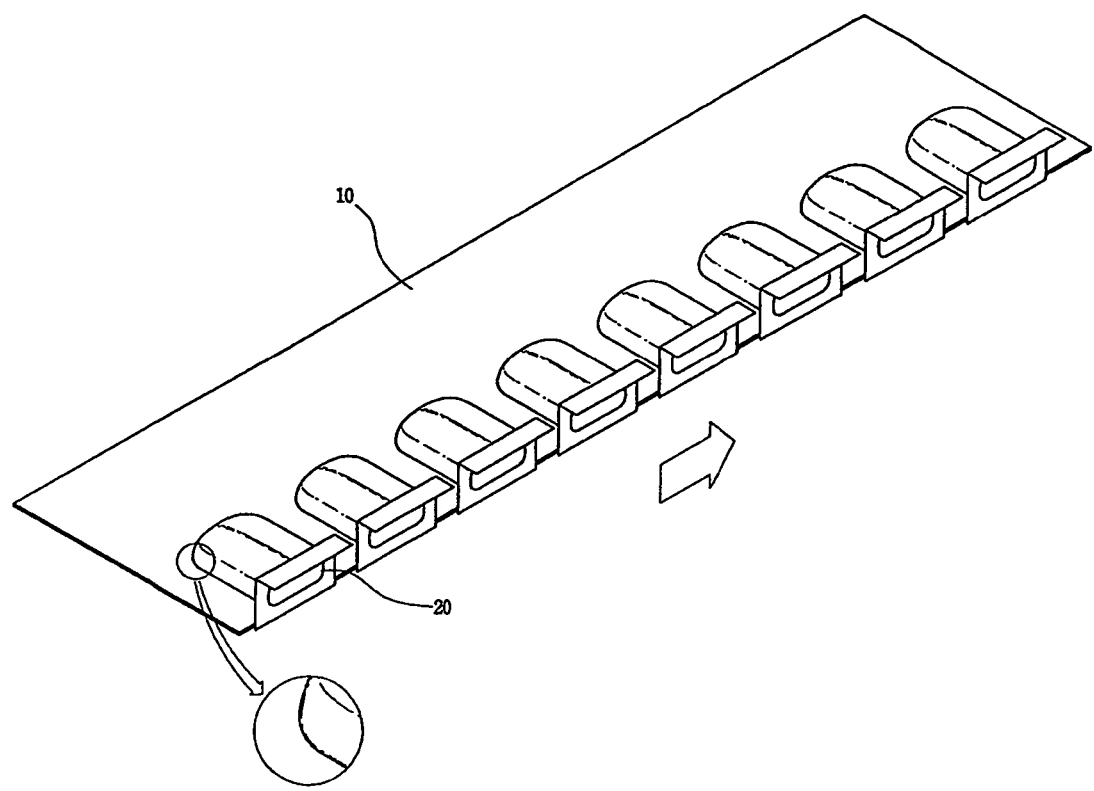

Referring now to the figures, FIGS. 1a to 1b illustrate a continuous manufacturing process of the pocket bread. The manufacturing process of the present invention comprises the steps of a kneading process of ingredients in an appropriate ratio, a first fermentation process of the kneaded dough, a molding process of the dough to form a pocket shape, a second fermentation process of the pocket-shape dough, and a baling process in an oven, wherein the molding process is constituted to be proper for automatic operation to provide mass production and standardized product having desired shape is produced by using appropriate molding frame and pen during the second fermentation and baking processes.

As in FIG. 1a, the sheet of dough (10) having a certain width and length is moved in a direction of length. The sheet of dough (10) may be supplied continuously but figures illustrate only a portion thereof for convenience. The width of the dough is not limited if it can be folded each other enough to cover the molding frame.

As shown in FIG. 1b, the molding frames (20) having a pocket shape are placed on the sheet of dough in a certain interval. The arrangement of the molding frames (20) can be operated manually or automatically. The bottom portion of the molding frame (20) is tetragonal while the junction of the side and bottom portion is round shape. The sealed portion may be thickened during the second fermentation process. Further, the molding frame (20) has a wall perpendicularly at a mouth portion of the pocket bread to prevent over fermentation of the mouth portion during the second fermentation process and obtain the pocket bread having uniform shape and size.

Figure 1C:
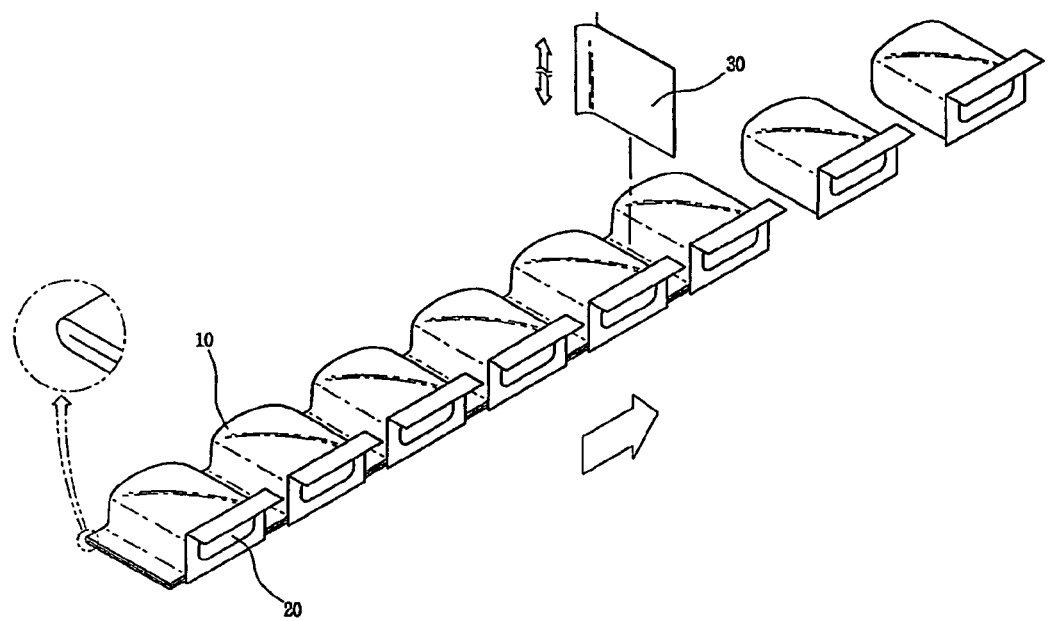

As shown in FIG. 1c, the sheet of dough (10) is folded in half to cover the molding frame (20) and cut with a cutting knife (30) to give pocket-shape bread containing the molding frame therebetween. The cutting knife (30) is straight-line or Y-type spliting at the end as shown in FIG. 1c. Another example of the cutting knife (30) has the same shape to the bottom portion of the molding frame but a little bit wider for the thickness of the dough. The edge of the dough is cut with this knife and simultaneously sealed with the pressure applied to cut the sheet of dough even though it is incomplete. The partially sealed portion is sealed almost completely during the followed fermentation process due to accelerated yeast activation and volume expansion to lead organic bonding. The sealed portion along with the cut line is baked to provide the pocket bread having uniform shape and homogenous constitution.

In the cutting process, the cutting is performed after the sheet of dough covers the entire top portion of the molding frame. More preferably, it is performed after the sheet of dough is covered the entire top portion of the molding frame and duly positioned to the shape of the molding frame with light press.

Figure 1D:
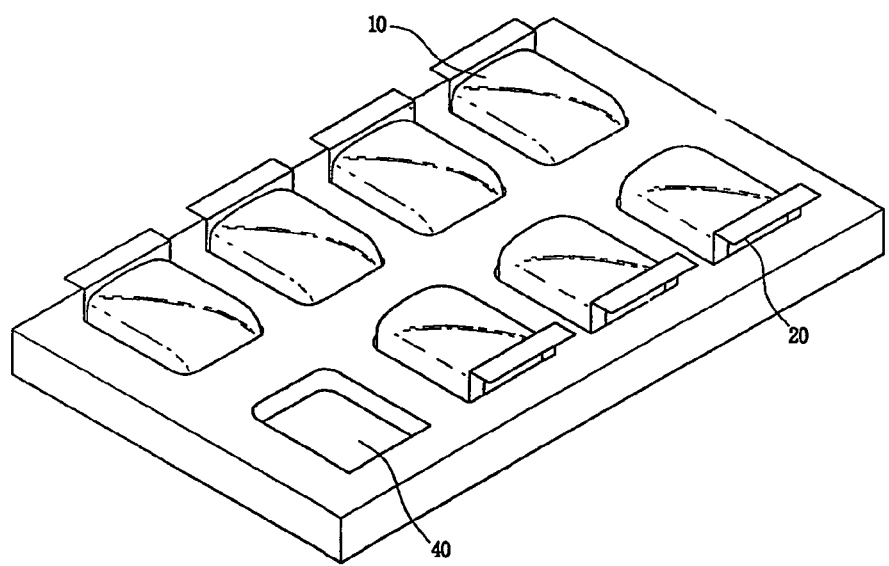
Figure 2:
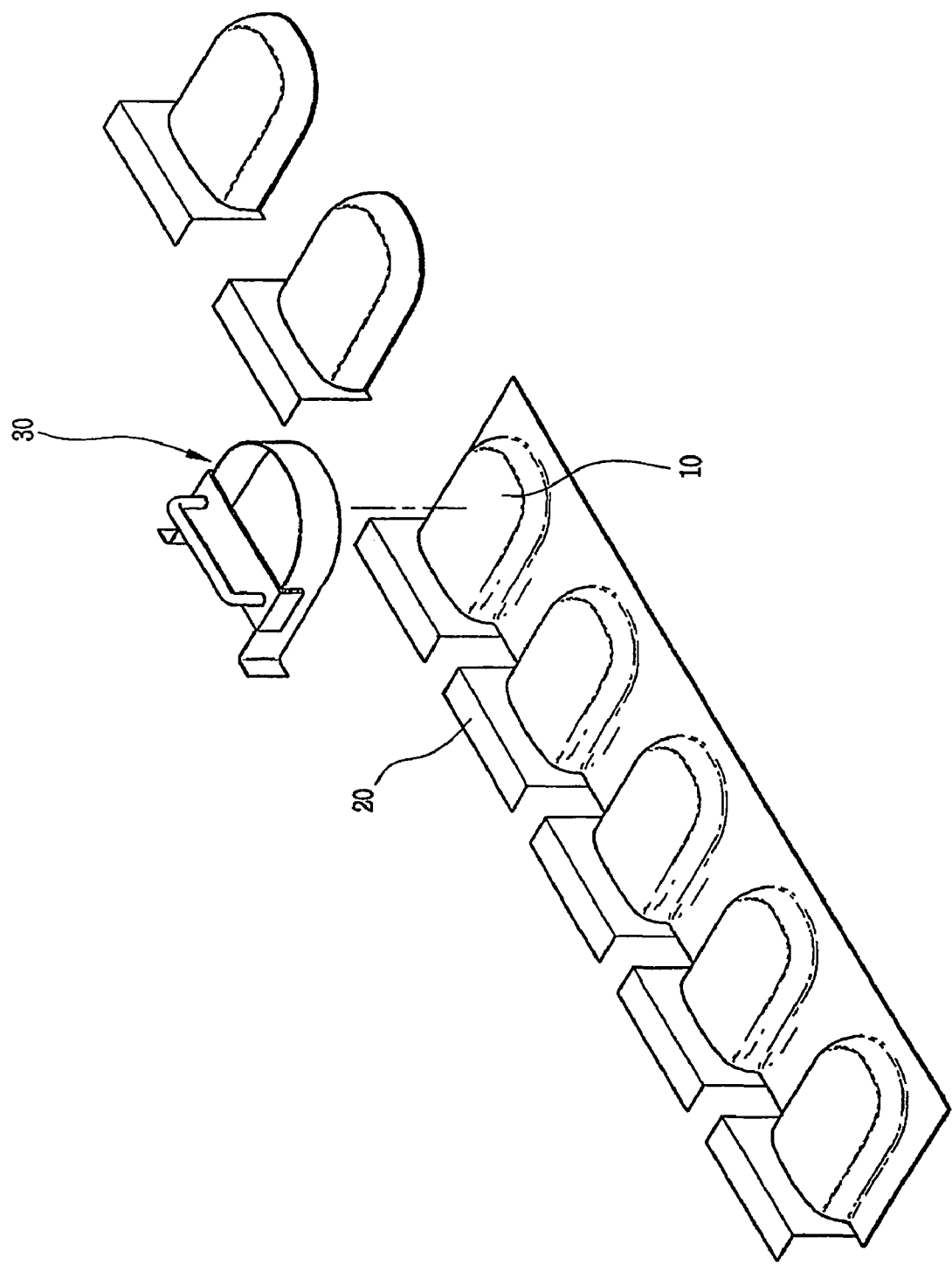
FIG. 2 is a sectional view of another example of the cutting knife used in the manufacturing process of the pocket bread according to the present invention.

As shown in FIG. 1d, the sealed dough is performed for the second fermentation in a concave pen (40) having a depth of 10 to 25 mm, preferably around 15 mm to provide complete pocket shape by holding the shape with external frame within the range of volume expansion during the fermentation.

The manufacturing process is operated automatically by cutting the sheet of dough moving continuously in a regular rate at the certain position with a cutting knife having a straight-line or Y-shape for mass production. Further, a probability of failure is decreased due to simple shape of knife and narrow cross-section. In the second fermentation process, the present invention uses the concave pen instead of a flat pen to provide uniform pocket shape bread by preventing from being flat. Therefore the present invention provides the pocket bread having uniform mouth portion by employing the molding frame having a wall at the one side perpendicularly and uniform pocket shape by employing the concave pen having a depth of 10 to 25 mm.

Figure 3:
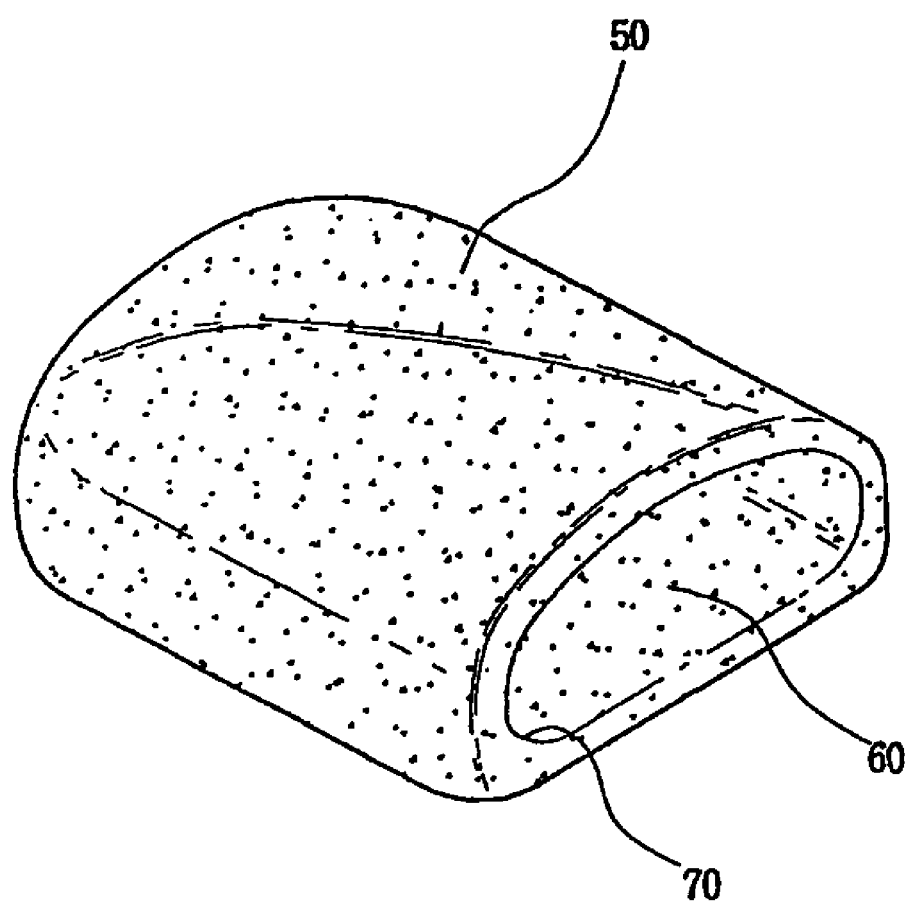
FIG. 3 is a sectional view of the pocket bread according to the present invention.

As shown in FIG. 3, the pocket bread of the present invention has uniform thickness of outer surface (50) and a pocket shape having unsealed portion as a mouth in the top and sealed portions in the side and bottom to introduce suitable fillers.

Further, the outer surface (50) of the pocket may be of oval cross-section which has longer width than height and the inner part (60) is a gently curved surface. The junction (70) of the side and bottom is a round surface. This round surface is obtained by using the molding frame having round mold. When the dough is expanded with the fermentation, it rises to the round-treated junction of the mold to provide natural round surface.

This round surface of the junction portion has thicker thickness, thus eliminating damages in the sealed portion when the round surface is pushed to fill fillings inside through the mouth.

When a cutting knife having straight-line which is the most useful for mass production is used, the outer surface has rectangular but the end side which is opposite to the mouth is curved.

For example, if it is desired to have a gentle curve, it requires only gentle shape of a concave pen at the opposite part of the mouth, thus the dough ferments and expands along with gentle curve during the second fermentation process. If it is desired to have a large curve, it requires only molding frame having desired curve shape at the opposite part of the mouth and a concave pen having the same sole of the molding frame and a wider width so much that the dough expands during the second fermentation process. Further, it is preferable to use a cutting knife having "Y"-shape to that having straight-line.

A pocket bread of the present invention has a gentle curve for the top surface and flat shape for the bottom surface. But it may have a gentle curve for the bottom surface, if necessary by having a convex and concave surface for the bottom surface of the molding frame and a concave pen.

It is preferable to have a uniform outer surface having a thickness of 8 to 15 mm, thus providing enough space to insert the fillings without damaging the bread.

EFFECT OF THE INVENTION

As described above, the present invention provides a pocket bread and its manufacturing method comprising the steps of folding the sheet of dough in half, placing the molding frame therebetween, cutting continuously the folded sheet of dough on either side of the molding frame to form a pocket shape of dough, and baking the pocket shape dough in the concave pen having pocket shape. It further provides some advantages in simple mass production with lowered inferiority during the manufacturing process, lowered manufacturing cost, and improved manufactured products with standardized manufactures.

What is claimed is:
1. A method of manufacturing a plurality of pocket breads, each sealed on three sides and having an open mouth, the method comprising:
    placing a plurality of molding frames between two sheets of fermented dough to form a plurality of pockets;
    cutting the dough on both sides of the molding frames with a cutting knife to form a plurality of pocket shaped pieces of dough;

separating each pocket shaped piece of dough and then placing each pocket shaped piece of dough in a concave pen;

fermenting each obtained pocket-shape dough in said concave pen having a depth of 10-25 mm; and baking each pocket-shape dough in said concave pen in an oven.

2. The method of manufacturing the pocket bread of claim 1, wherein said two sheets of dough are provided by folding a single sheet of dough.

3. The method for manufacturing the pocket bread of claim 1, wherein a plurality of molding frames are placed on the sheet of dough and the sheet of dough is cut by using a cuffing knife operating repeatedly in the molding process.

4. The method of manufacturing a pocket bread of claim 1 or claim 3, wherein the molding frame has a top surface, a bottom surface, 3 side surfaces linking the top and the bottom surface, and a wall providing a mouth, wherein edges linking the top and three side surfaces have a curve, wherein edges linking the bottom and three side surfaces have a round shape.

5. The method of manufacturing the pocket bread of claim 1 or claim 3, wherein said cutting knife has straight-line or "Y"-shape splitting at the end.

6. The method of manufacturing the pocket bread of claim 1 or claim 2, wherein the pocket shape dough is fermented and baked in a concave pen having a pocket-shaped groove and a depth of 10 to 25 mm.

7. The method of manufacturing the pocket bread of claim 1 or claim 3, wherein said cutting knife has "Y"-shape splitting at the end.

* * * * *

UNITED STATES PATENT AND TRADEMARK OFFICE
CERTIFICATE OF CORRECTION

PATENT NO.        : 7,514,108 B2
APPLICATION NO.   : 10/474002
DATED             : April 7, 2009
INVENTOR(S)       : Seuk Won You It is certified that error appears in the above-identified patent and that said Letters Patent is hereby corrected as shown below:

In claim 3, column 5, line 13, "cuffing" should read --cutting--.

Signed and Sealed this

Nineteenth Day of May, 2009

JOHN DOLL
*Acting Director of the United States Patent and Trademark Office*